Figure 3:
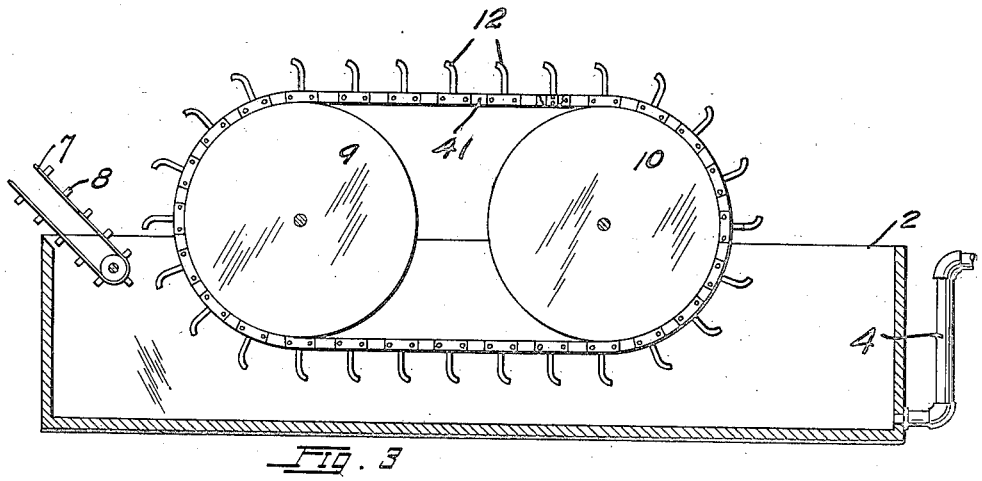

Aug. 14, 1923.
E. L. MACABEE
1,465,085
WASHING APPARATUS
Filed March 1, 1920     4 Sheets-Sheet 1
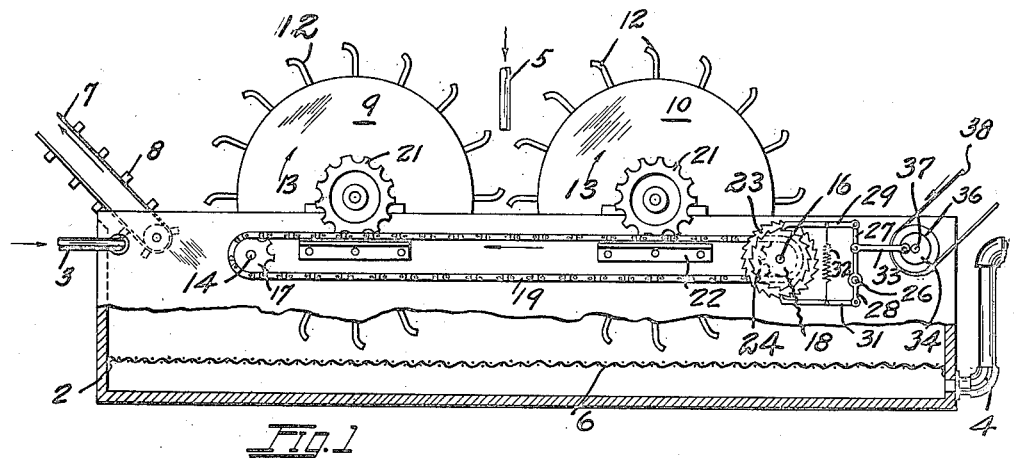
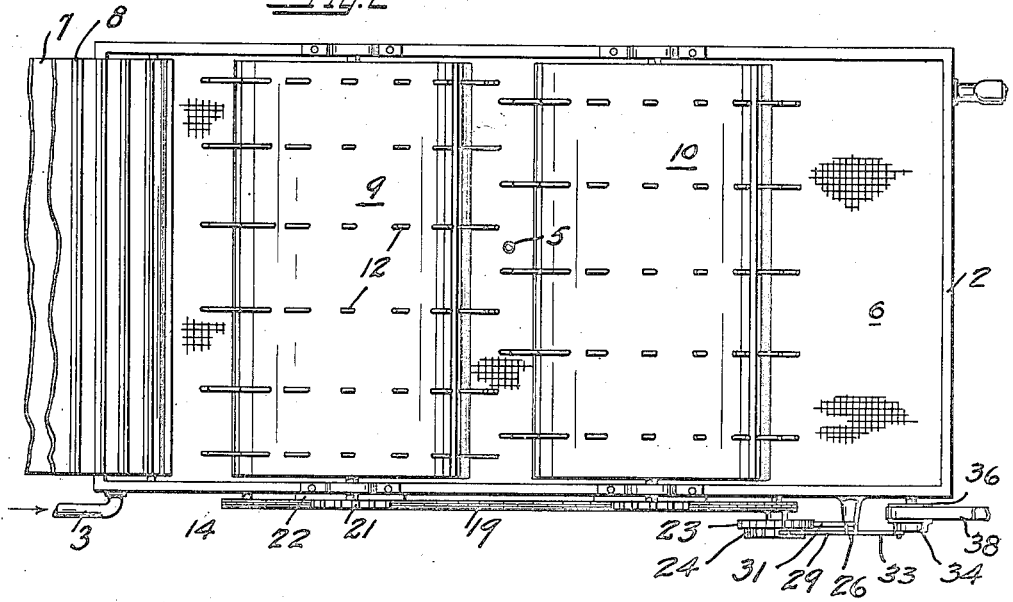
Witness:
C. S. Evans
Inventor
EDWARD L. MACABEE.
by White Spratt
his Attys.

Aug. 14, 1923.

E. L. MACABEE 1,465,085

WASHING APPARATUS

Filed March 1, 1920

4 Sheets-Sheet 2

Witness:
C. S. Evans

Inventor
EDWARD L. MACABEE.

by White & Prost
his Att'ys.

Aug. 14, 1923.
E. L. MACABEE
WASHING APPARATUS
Filed March 1, 1920 4 Sheets-Sheet 4
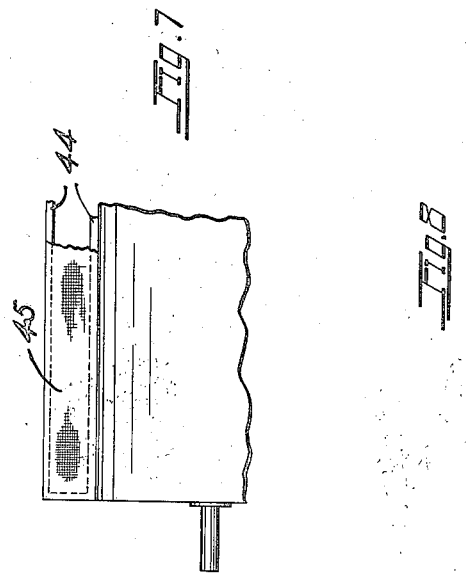
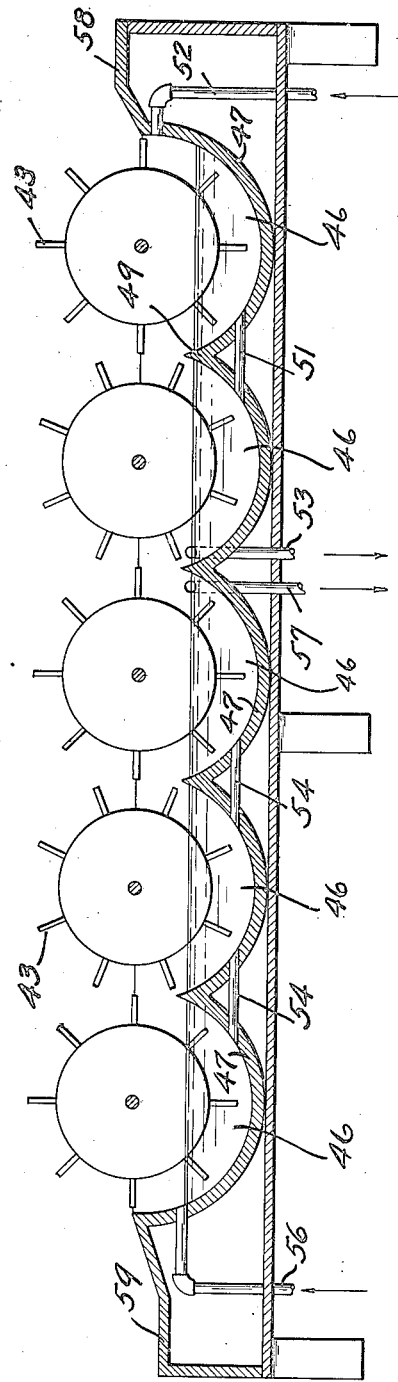
Witness:
C. S. Evans
Inventor
EDWARD L. MACABEE
by White & Prout
his Attys.

Patented Aug. 14, 1923.

1,465,085

UNITED STATES PATENT OFFICE.

EDWARD L. MACABEE, OF HAYWARDS, CALIFORNIA, ASSIGNOR TO HUNT BROTHERS PACKING COMPANY, OF SAN FRANCISCO, CALIFORNIA, A CORPORATION OF CALIFORNIA.

WASHING APPARATUS.

Application filed March 1, 1920. Serial No. 362,338.

*To all whom it may concern:*

Be it known that I, EDWARD L. MACABEE, a citizen of the United States, and a resident of Haywards, county of Alameda, State of California, have invented a new and useful Washing Apparatus, of which the following is a specification.

My invention relates to machines for washing articles especially vegetables and fruits.

An object of the invention is to provide a machine for the thorough washing of spinach and similar leaf vegetables.

Another object of the invention is to provide a machine for washing the skins from fruits after the skins have been loosened by treatment in a lye or other solution.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Figure 5:
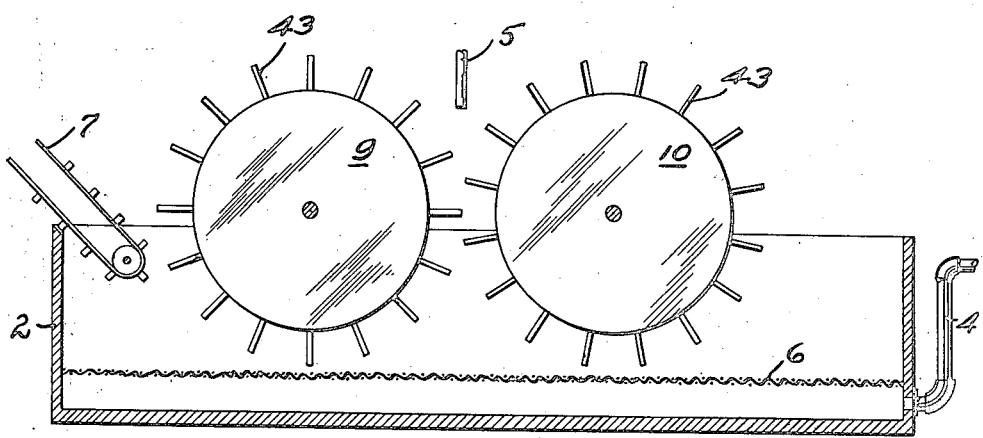
Figure 6:
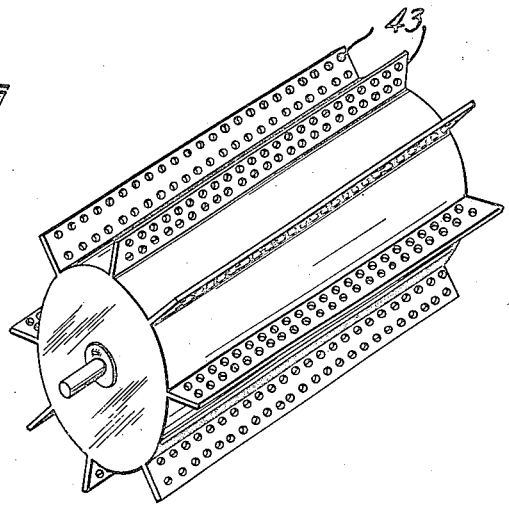

Referring to the drawings:

Figure 1 is a side elevation of one form of my washing apparatus. Figure 2 is a plan view of the structure shown in Figure 1. Figure 3 is a vertical sectional view of another embodiment of my invention, the plane of section being indicated by the line 3—3 of Figure 4, which is a plan view of the apparatus shown in Figure 3. Figure 5 is a vertical sectional view similar to Figure 3, showing an embodiment of my invention, particularly adapted for washing the skins from fruits after their treatment in a lye solution. Figure 6 is a perspective view of one of the drums from the structure shown in Figure 5. Figure 7 is an elevation of a portion of a modified form of drum, showing a paddle formed of a frame covered by a fabric. Figure 8 is a vertical sectional view similar to Figures 3 and 5, showing an embodiment of my invention, particularly useful in handling peaches through a lye solution and wash water in one continuous operation.

Referring first to Figures 1 and 2. Vegetables such as spinach are particularly hard to cleanse from adhering particles of dirt and sand which lodge in the folds and creases of the leaves in such a manner that an ordinary current of water will not dislodge them. I have therefore devised means for giving the material to be washed, a back- and-forth, reciprocating or shaking motion in a stream of water, approximating the movement imparted by the hands when such material is washed.

As shown in Figures 1 and 2 my washing apparatus, as preferably made for washing leaf vegetables, comprises a tank 2 through which water flows, entering through pipe 3 and discharging through pipe 4 which is connected adjacent the bottom so that dirt sinking to the bottom is more readily carried off. The pipe rises a short distance vertically outside the tank to fix the level of the water therein. Preferably water is also introduced between the drums through pipe 5.

Below the drums is a rather coarse screen 6 which prevents the vegetables from falling to the bottom, but allows the loosened dirt to pass through. A draper 7 preferably with slats 8 thereon is arranged at the discharge end of the tank to carry out the washed material.

Two drums 9 and 10 are rotatably mounted in bearings arranged on the edges of the tank and are provided with pins 12 adapted to engage the vegetables. The pins have blunt ends curved backwardly in respect of the direction of rotation of the drums. Means are provided for imparting to the drums 9 and 10 an interrupted but progressive rotary movement in the direction shown by the arrows 13, the forward movements being alternated with reverse movements through a smaller arc. The resultant motion in respect of the pins 12 is a back-and- forth or reciprocating or shaking one, which thoroughly washes the material lodged upon the pins. This motion is supplemented by an interrupted forward rotary movement of the drums which carries the material onward through the machine. Rotatably mounted on studs 14 and 16 fixed on the side of the tank are sprocket wheels 17 and 18 respectively connected by a chain 19, the upper reach of which also engages spockets 21 secured to the shafts of the drums 9 and 10. In order to prevent disengagement of the chain from the sprockets 21, a plate 22 is secured below each sprocket, the chain passing between the two. The sprocket 18 is formed on a sleeve which is also provided with ratchet wheels 23 and 24 fixed thereto. The ratchet teeth on the two wheels are oppositely formed and wheel 23 is somewhat larger than wheel 24. Pivoted on the stud 26 fixed on the tank is a lever having unequal arms 27 and 28. Pivoted to the end of the long arm 27 is a pawl 29 engaging the smaller ratchet wheel 24, and pivoted to the end of the short arm 28 is a pawl 31 engaging the larger ratchet wheel 23. The pawls are resiliently retained in engagement with the ratchet wheels by a coil spring 32 connecting the two. The lever is vibrated by a connecting rod 33 pivoted to the lever and to a crank disk 34 mounted for rotation with a pulley 36 on the stud 37 fixed on the tank. The pulley is connected by belt 38 to any suitable source of power. Vibration of the lever effects, by means of the pawls, ratchets and chain, the characteristic reciprocating rotary motion of the drums. The forward movement of the drums is caused by the operation of the long lever arm 27 upon the smaller ratchet wheel, and this motion is followed by a backward motion caused by the operation of the short lever arm upon the larger ratchet. Since the longer lever arm working on the smaller ratchet wheel produces rotary motion of the sprocket 18 through a greater arc than that produced by the shorter lever arm working on the larger ratchet wheel, it follows that the difference in the length of the arcs of forward and backward movement is the net forward gain for each complete revolution of the crank disk 34. With continuous rotation of the pulley 36, there is thus a slow rotation of the drums in addition to their reciprocating movement.

The vegetable or material to be washed is thrown into the tank at the end shown at the right in the figures of the drawing. Caught by the pins 12 the material is repeatedly shaken or moved back and forth in the water and at the same time given a progressive movement toward the second drum, where the process is repeated. It is not intended that the material shall be carried around on the drums. The curved ends of the pins facilitate the disengagement of the material which drops back into the water as the pins rise toward a horizontal position above the water. By the time the material has passed the second drum it has been shaken clear of all adhering particles and thoroughly washed. As the washed material reaches the discharge end of the tank, it lodges on the slatted draper 7 and is carried out of the machine and permitted to fall into an appropriate receptacle.

Figure 4:
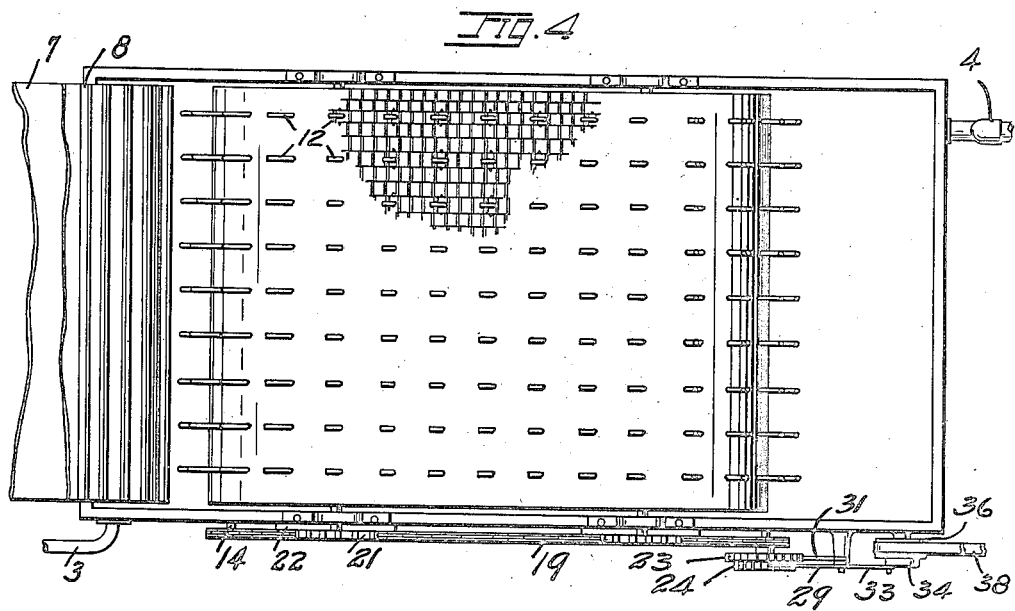

In Figures 3 and 4 I have shown an embodiment of my invention which differs from that just explained by the inclusion of a steel doormat belt 41 arranged upon the drums. In this case the pins 12 are secured by rivets to the links of the belt and are arranged in parallel rows upon the belt as shown in Figure 4. The auxiliary water supply pipe 5 and the bottom screen may be omitted in this form of the apparatus.

The operation of the apparatus is the same as that first described but with the added advantage that the vegetables or other material being washed are kept submerged continuously during their progress through the tank, the lower reach of the belt preventing the material from rising to the surface between the drums. This construction possesses a further advantage in that the distance between the drums may be made such as to give a longer washing period than is possible with the apparatus shown in Figure 1.

In Figure 5 I have shown an apparatus particularly adapted for washing the skin from peaches or other fruits after the skin has been loosened by treatment in a lye or other solution. It differs from the structure shown in Figure 1, only in the drums which are provided with perforated plates or paddles 43 instead of with pins. The plates are perforated so that movement of the water is reduced to a minimum, it being desired to confine the movement to the fruit so far as possible. In Figure 7, a modified drum structure is shown. Instead of perforated plates, paddles comprising frames 44 are fixed to the drum and covered with a loosely woven fabric 45. In either construction the paddles impart to the fruit a back-and-forth washing movement in the water as well as a progressive forward movement toward the discharge end of the tank.

In Figure 8, I have shown an embodiment of my invention in an apparatus in which treatment of the fruit in a lye or other solution to loosen the skins, and washing the fruit to free it from the solution and disintegrated skins, is carried on as a continuous process. The drum and driving structure is similar to that shown in Figure 5. The tank is divided, as shown, into a series of compartments 46, one for each drum of which there may be five. The bottoms 47 of the compartments are cylindrical and the sizes of the parts are such that the outer edges of the paddles 43 clear the bottoms by a small amount. The bottoms of adjacent compartments meet in a ridge 49 over which the fruit is lifted by the paddles in its progression from one compartment to the next. The driving sprockets on the drum shafts are engaged in the driving chain so that the paddles on one drum lie opposite the spaces between the paddles on the adjacent drum so that when the pieces of fruit are lifted over the ridges, their falling on the other side is not prevented by the paddles of the drum on that side. The first two compartments 46 (right of Figure 8) are connected by a passage 51 and receive a lye or other solution for loosening the fruit skins, through the pipe 52, a discharge pipe 53 being connected to the end of the second compartment. The next three compartments 46 (left of Figure 8) are connected together by pipes 54 and washing water is introduced into the last compartment through pipe 56, discharging from the middle compartment of the apparatus through pipe 57.

Fruit to be peeled is fed into the first compartment from feeding table 58, and after passing through the solution in the first two compartments enters the first washing compartment, which is the middle one of the group. From this, the fruit progresses through the remaining two compartments in which the water is progressively fresher and is finally delivered, thoroughly washed, upon the discharge table 59.

I claim:

1. A washing apparatus comprising a tank adapted to contain washing liquid, a drum in said liquid, means on the drum for catching material to be washed and means for imparting to the drum a reciprocating rotary motion.

2. A washing apparatus comprising a tank adapted to contain washing liquid, a drum in said liquid, means on the drum for catching material to be washed, and means for imparting to the drum a reciprocating rotary motion and an interrupted progressive rotary motion.

3. A washing apparatus comprising a tank adapted to contain washing liquid, a drum rotatably supported in said liquid, means on the drum for catching material to be washed, means for rotating the drum, and means for reciprocating the rotary means whereby the drum is given a rotary motion comprising forward movements alternated with reversed movements of less extent than the forward movements.

4. A washing apparatus comprising a tank adapted to contain washing liquid, a drum rotatably supported in said liquid, means on the drum for catching material to be washed, a driving sprocket for said drums, a chain connecting said sprocket for rotation with said drums, and means for imparting to said sprocket a rotary motion comprising forward movements alternated with reverse movements of less extent than the forward movements.

5. A washing apparatus comprising a tank adapted to contain washing liquid, a drum rotatably supported in said liquid, means on the drum for catching material to be washed, a pair of sprockets, a chain on said sprockets, a sprocket on said drum shaft engaging said chain, a pair of ratchet wheels mounted for rotation with one of said pair of sprockets, a lever pivoted adjacent said ratchet wheels, pawls pivoted to opposite ends of said lever and engaging said ratchet wheels, and means for vibrating said lever.

6. A washing apparatus comprising a tank adapted to contain washing liquid, a drum rotatably supported in said liquid, means on the drum for catching material to be washed, a pair of sprockets, a chain on said sprockets, a sprocket on said drum shaft engaging said chain, a large and a small ratchet wheel mounted for rotation with one of said pair of sprockets, a lever pivoted adjacent said ratchet wheels, pawls pivoted to opposite ends of said lever and engaging said ratchet wheels, and means for vibrating said lever.

7. A washing apparatus comprising a tank adapted to contain washing liquid, a drum rotatably supported in said liquid, means on the drum for catching material to be washed, a pair of sprockets, a chain on said sprockets, a sprocket on said drum shaft engaging said chain, a large and a small ratchet wheel mounted for rotation with one of said pair of sprockets, a lever pivoted about an axis nearer one of its ends than the other, a pawl pivoted to the long arm of said lever and engaging the smaller of said ratchet wheels, a pawl pivoted to the short arm of said lever and engaging the larger of said ratchet wheels, and means for vibrating said lever.

8. A washing apparatus comprising a tank adapted to contain washing liquid, a drum rotatably supported in said liquid, means on the drum for catching material to be washed, a pair of sprockets, a chain on said sprockets, a sprocket on said drum shaft engaging said chain, a pair of ratchet wheels mounted for rotation with one of said pair of sprockets, a lever pivoted about an axis nearer one of its ends than the other, a pawl pivoted to the long arm of said lever and engaging the smaller of said ratchet wheels, pawls pivoted to the ends of the short and long arms of said lever and engaging said ratchet wheels, and means for vibrating said lever.

9. A washing apparatus comprising a tank adapted to contain washing liquid, a drum rotatably supported in said liquid, means on the drum for catching material to be washed, a pair of sprockets, a chain on said sprockets, a sprocket on said drum shaft engaging said chain, a pair of ratchet wheels mounted for rotation with one of said pair of sprockets, a lever pivoted adjacent said ratchet wheels, pawls pivoted to opposite ends of said lever and engaging said ratchet wheels, a shaft, means for turning said shaft, a crank on said shaft and a rod connecting said crank to said lever.

10. A washing apparatus comprising a tank adapted to contain washing liquid, drums rotatably supported in said liquid, a belt on said drums, pins on said belt for catching material to be washed and having their ends curved to facilitate disengagement from said material, and means for imparting to the drums a reciprocating motion and an interrupted progressive rotary motion.

11. In a washing apparatus, a tank for holding a washing liquid, an endless belt, means carried by the belt for engaging material to be washed, and a drive for the belt comprising a reciprocating member engaging the belt, the reciprocations of said member in opposite directions being of unequal extent.

12. In a washing apparatus, a tank for holding a washing liquid, means within the tank for engaging the material to be washed, and means for moving said means within the tank, comprising a reciprocating member connected to said engaging means, the reciprocations of said member in opposite directions being of unequal extent.

13. A washing apparatus comprising a tank adapted to contain washing liquid, an endless belt in said tank, and means for directly driving the belt so that it has a reciprocatory progressive motion through said liquid.

In testimony whereof, I have hereunto set my hand at San Francisco, California, this 20th day of February, 1920.

EDWARD L. MACABEE.

In presence of—
C. S. EVANS,
W. W. HEALEY.